(12) United States Patent
Martin Blazquez et al.

(10) Patent No.: US 12,054,292 B2
(45) Date of Patent: Aug. 6, 2024

(54) METHOD FOR THE ASSEMBLY OF FRAMES IN AN AIRCRAFT SHELL

(71) Applicant: Airbus Operations S.L., Getafe (ES)

(72) Inventors: Cesar Martin Blazquez, Getafe (ES); Carlos Flores Hernandez, Getafe (ES)

(73) Assignee: Airbus Operations S.L., Getafe (ES)

( * ) Notice: Subject to any disclaimer, the term of this patent is extended or adjusted under 35 U.S.C. 154(b) by 0 days.

(21) Appl. No.: 17/861,371

(22) Filed: Jul. 11, 2022

(65) Prior Publication Data

US 2023/0014715 A1 Jan. 19, 2023

(51) Int. Cl.
*B64F 5/10* (2017.01)
*B64C 1/06* (2006.01)

(52) U.S. Cl.
CPC ........... *B64F 5/10* (2017.01); *B64C 1/061* (2013.01); *B64C 1/064* (2013.01)

(58) Field of Classification Search
CPC .......... B25J 19/023; B25J 9/1687; B64F 5/10
See application file for complete search history.

(56) References Cited

U.S. PATENT DOCUMENTS

| | | | | |
|---|---|---|---|---|
| 4,885,836 A * | 12/1989 | Bonomi | ................. | B25J 9/0084 29/818 |
| 5,380,978 A * | 1/1995 | Pryor | ................. | B23K 26/0846 219/121.79 |
| 5,586,391 A * | 12/1996 | Micale | ................... | B23Q 35/02 29/407.05 |
| 6,003,812 A * | 12/1999 | Micale | ................... | B25J 9/1687 244/119 |
| 6,317,954 B1 * | 11/2001 | Cunningham | ....... | G01B 11/002 29/709 |
| 7,555,404 B2 * | 6/2009 | Brennan | ................. | B29C 70/32 156/64 |
| 7,780,070 B2 * | 8/2010 | Salour | ....................... | B64F 5/10 235/487 |
| 8,403,201 B2 * | 3/2013 | Ragni | ....................... | B64F 5/50 228/44.5 |

(Continued)

FOREIGN PATENT DOCUMENTS

| | | | |
|---|---|---|---|
| DE | 202008014886 U1 * | 5/2010 | ............ B21J 15/022 |
| EP | 2965836 A1 | 1/2016 | |

(Continued)

OTHER PUBLICATIONS

DE-202008014886-U1 Machine Translation (Year: 2010).*
European Search Report; priority document.

*Primary Examiner* — Michael W Hotchkiss
(74) *Attorney, Agent, or Firm* — Greer, Burns & Crain, Ltd.

(57) ABSTRACT

A method for the assembly of frames in an aircraft shell, wherein the aircraft shell comprises a skin and a plurality of stringers co-cured with the skin, wherein the skin has a plurality of reference marks. Identifying the reference marks on the skin using a first robot with artificial vision, establishing a local reference for the positioning of each frame based on a reference mark, grabbing a frame using the first robot, establishing a relative position between the first robot and the frame based on the reference mark, positioning the frame on an inner side of the aircraft shell using the first robot, and with a second robot, drilling holes through the frame and skin, and attaching the frame to the skin with fasteners.

17 Claims, 4 Drawing Sheets

(56) References Cited

U.S. PATENT DOCUMENTS

| | | | |
|---|---|---|---|
| 8,510,952 B2* | 8/2013 | Amirehteshami | B25J 9/1682 |
| | | | 700/19 |
| 9,789,462 B2* | 10/2017 | Singh | B23K 26/082 |
| 10,792,728 B2* | 10/2020 | Oberoi | B23P 19/10 |
| 11,040,783 B2* | 6/2021 | Ishida | B23P 19/04 |
| 11,059,605 B2* | 7/2021 | Ishida | B23P 21/00 |
| 11,117,184 B2* | 9/2021 | Hirai | B21J 15/42 |
| 11,167,835 B2* | 11/2021 | Pina Lopez | B64C 1/061 |
| 2009/0277994 A1* | 11/2009 | Lobato | B64C 1/12 |
| | | | 244/119 |
| 2010/0010660 A1* | 1/2010 | Salour | B64F 5/10 |
| | | | 700/117 |
| 2010/0217437 A1* | 8/2010 | Sarh | B64F 5/10 |
| | | | 700/248 |
| 2012/0305195 A1* | 12/2012 | Sana | B29C 33/485 |
| | | | 156/349 |
| 2013/0212883 A1* | 8/2013 | Soto Martinez | B21J 15/022 |
| | | | 81/57.37 |
| 2014/0090252 A1* | 4/2014 | Sisco | B23P 21/004 |
| | | | 29/33 R |
| 2014/0173879 A1* | 6/2014 | Negroni | B23B 35/00 |
| | | | 29/525.01 |
| 2016/0288331 A1* | 10/2016 | Sivich | B25J 9/1687 |
| 2017/0369186 A1* | 12/2017 | Goto | B64C 1/068 |
| 2018/0050824 A1* | 2/2018 | Regnault | B64F 5/10 |
| 2018/0297717 A1* | 10/2018 | Haldimann | G06T 7/0004 |
| 2019/0160610 A1* | 5/2019 | Reid | B25J 5/02 |
| 2019/0263539 A1* | 8/2019 | Ishida | B23P 19/00 |
| 2019/0276164 A1* | 9/2019 | Ishida | B23P 21/002 |
| 2019/0283902 A1* | 9/2019 | Ishida | B64C 1/12 |
| 2020/0180011 A1* | 6/2020 | Oberoi | B21J 15/40 |
| 2020/0326689 A1* | 10/2020 | Borowicz | G05B 19/401 |
| 2022/0153436 A1* | 5/2022 | Smith | B64C 1/061 |

FOREIGN PATENT DOCUMENTS

| | | |
|---|---|---|
| EP | 3556650 A1 | 10/2019 |
| EP | 3726314 A1 | 10/2020 |

* cited by examiner

METHOD FOR THE ASSEMBLY OF FRAMES IN AN AIRCRAFT SHELL

CROSS-REFERENCES TO RELATED APPLICATIONS

This application claims the benefit of the European patent application No. 21382641.5 filed on Jul. 15, 2021, the entire disclosures of which are incorporated herein by way of reference.

FIELD OF THE INVENTION

The present invention belongs to the field of aircraft parts manufacturing and, particularly, it refers to a method for the assembly of frames in an aircraft shell. The invention also provides a method for the manufacturing of an aircraft shell having frames.

BACKGROUND OF THE INVENTION

The known process for positioning frames in an aircraft shell is based on both an accurate tooling able to place the frame in a specific position in the space and a tooling for handling and carrying through different stations the aircraft shell. As will be shown below, the relation of the mentioned two different tooling is an aggregate of several tolerance contributors.

A known process for positioning frames in an aircraft shell is as follows. A skin is co-cured with the required stringers. During the curing process marks are performed on the skin. Taking these marks as a reference, either drilling templates are positioned aligning visually the lines on the skin and the lines on the templates to manually drill tooling holes or an automatic drilling machine reads these marks and drills the tooling holes. The drilled tooling holes are used afterwards to carry and position the aircraft shell.

The aircraft shell with the drilled tooling holes is introduced in a shell positioning tooling or first jig to keep its geometry during the assembly of the frames. The tooling holes performed in the previous step are used to fix the aircraft shell to the first jig using tooling pins. The first jig will be also used to position the aircraft shell inside the assembly station.

In the assembly station, four positioners lift the first jig to reach the right position of the aircraft shell. Each positioner is configured to be expandable and compressible along a longitudinal direction and comprises a supporting cone. The first jig is equipped with four balls that fit into the four supporting cones. By the expansion/compression of each positioner the jig holding the aircraft shell is placed at the appropriate position.

Before the entrance of the aircraft shell into the assembly station, the aircraft frames are loaded into a frame positioning tooling or second jig installed in the station. This second jig is adjusted taking as reference the four supporting cones of the positioners.

Once the aircraft shell is in place, the second jig approaches the frames to the skin and the frames are back drilled from inside to outside manually. The frames are fixed with temporary fasteners.

As a final step, the aircraft shell is moved to another station where the frames are drilled up to their final diameter.

According to the known process, the accurate positioning and fixing of both the aircraft shell and the frames requires dedicated tooling. Consequently, any design change in the positioning of a frame or in the frame itself entails expensive tooling adaptation and modification of several assembly stations, which hinders the implementation of design changes.

Additionally, the known process of frame positioning requires human intervention, which slows down the process and makes it dependent on the operator's skills.

Furthermore, as a result of the known process of frame positioning, the following tolerances stack:

Automatic drilling of tooling holes: 0.3 mm
Tooling pins+Tooling pins holes geometry: 0.2 mm
Positioners: 0.2 mm
Centering of the first jig in the station: 0.2 mm
Frame positioning tooling (second jig): 0.4 mm
Shell and frame: 0.4 mm Thus, a tolerance up to ±1.7 mm may result from the known process.

Therefore, there is a need in the industry for a more efficient process for positioning the frames in the aircraft shell, with reduced tolerances and enhanced flexibility to implement design changes.

SUMMARY OF THE INVENTION

The present invention provides a solution for the aforementioned problems, by a method for the assembly of frames in an aircraft shell.

In a first inventive aspect, the invention provides a method for the assembly of frames in an aircraft shell, wherein the aircraft shell comprises a skin and a plurality of stringers co-cured with the skin and wherein the skin has a plurality of reference marks, the method comprising the following steps:

(a) identifying the reference marks on the skin using a first robot with artificial vision on board;
(b) establishing a local reference for the positioning of each frame based on at least one reference mark;
(c) grabbing a frame using the first robot;
(d) establishing a relative position between the first robot and the frame based on at least one reference feature of the frame;
(e) positioning the frame on an inner side of the aircraft shell using the first robot;
(f) drilling holes through the frame and skin; and
(g) attaching the frame to the skin with fasteners;
wherein steps (f) and (g) are performed by a second robot.

The present invention provides a method for the assembly of frames in an aircraft shell comprising a skin and a plurality of stringers. The present method uses reference marks, present in the skin, as a visual reference for positioning the frames. In particular, the reference marks are present on an inner side of the skin. The inner side of the skin will be understood as the side of the skin where the stringers are located and it is also the side of the skin intended for placing the frames.

According to the method of the present invention, a step (a) comprises identifying the reference marks present on the skin using a first robot with artificial vision on board. Based on at least one identified reference mark, a local reference is established for the positioning of each frame. This step (b) involves defining the position of the first robot relative to the aircraft shell for the positioning of each frame. According to the present method one or several frames may be assembled. Preferably, a plurality of frames are assembled. A different local reference may be used for positioning each frame. Also, a single local reference may be used for positioning more than one frame.

According to step (c), a frame to be assembled is grabbed using the first robot. Once the frame is grabbed, a relative position between the first robot and the frame is established based on at least one reference feature of the frame. The reference feature of the frame shall be understood as any feature of the frame visually detectable by the first robot, such as a mark, a contour of the frame, or a hole. The reference feature may be a dedicated feature provided as a visual indication for its recognition by the first robot or may be a distinguishable feature present in the frame for an additional purpose, such as a hole or a slot for the installation of wiring or other elements. A single reference feature or a combination of reference features may be used.

Once the relative position between the first robot and the frame is established, the first robot positions the frame on an inner side of the aircraft shell. The inner side of the aircraft shell shall be understood as the side intended for the placement of the frames. The outer side of the aircraft shell is the side opposed to the inner side.

While the frame is held in place by the first robot, holes are drilled through the frame and the skin. The holes are used to attach the frame to the skin with fasteners, such as bolts. According to the present invention, the steps of drilling holes and attaching the frames to the skin using the holes are performed by a second robot, thus avoiding manual operations.

Compared to the known process for frame positioning, the method of the present invention reduces tolerances, since several steps are avoided, such as drilling holes for the fixing of the aircraft shell to a tooling, positioning of frames and aircraft shell in respective tooling or relative positioning of both tooling. Instead, the positioning of the frames is performed by a first robot based on reference marks and reference features present on the skin and frame, respectively. The method of the present invention only has the tolerance of the first robot to position the frame, which will be around ±0.4 mm, much lower than the 1.7 mm tolerance present in the known process. As a result, a more precise positioning is achieved, the quality of the aircraft shell is improved and the repeatability of the process is increased.

A further advantage provided by the method of the present invention is that tooling to hold the aircraft shell in a very rigid and accurate manner is no longer needed, since the aircraft shell is only fixed to avoid movement during the installation and drilling. This results in a shorter time to market in any new product, thanks to the less stringent requirements regarding the needed tooling. Also, a frame change does not require expensive tooling adaptation, which increases the flexibility of the industrial set up to face any design change.

Additionally, the method of the present invention allows the automation of the whole process. Since frame positioning does not depend on human intervention, it can be parallelized with automatic drilling tasks.

In an embodiment, steps (f) and (g) are performed by a second robot working from an outer side of the aircraft shell while the first robot holds the frame in place on the inner side of the aircraft shell. Thus, the holes are drilled from outside to inside of the aircraft shell. Advantageously, by positioning and holding the frames using a first robot and drilling holes and attaching the frame with fasteners using a second robot, each robot working from a different side of the aircraft shell, a more efficient process is achieved.

In an embodiment, the first and the second robot are configured to communicate one with another and/or with a controller.

In an embodiment, once a local reference for the positioning of the frame has been established, the second robot receives data, the data comprising the local reference and/or the position of the first robot. Based on the received data, the second robot establishes its own position relative to the aircraft shell.

In an embodiment, the local reference and/or the position of the first robot may be provided in the form of spatial coordinates.

In an embodiment the data is transmitted to the second robot by the first robot and/or by a controller configured to register the local reference and/or the position of the first robot and to transmit it to the second robot.

In an embodiment where more than one frame is assembled, data comprising a local reference and/or the position of the first robot is sent to the second robot for the positioning of each frame.

In an embodiment, the data received by the second robot comprises a command to start drilling holes for the attachment of a frame already placed in position on the inner side of the aircraft shell by the first robot.

In an embodiment, when the second robot has arranged a predetermined number of fasteners, a command is sent to the first robot to release the current frame and/or to grab a new frame. In an embodiment the command is transmitted to the first robot by the second robot and/or by a controller.

In an embodiment, the at least one reference feature of the frame is a mark, a contour of the frame, a hole or a combination thereof. The reference feature of the frame may be provided in a number of ways, such as a mark performed on the frame, a hole present in the frame (for example a hole for the installation of wiring or other elements) or a contour of the frame itself. More than one reference feature may be used.

In an embodiment, step (g) comprises a first sub-step of installing temporary fasteners and a second sub-step of installing final fasteners. Advantageously, by installing temporary fasteners, a first frame may be temporary secured to avoid movement thereof, such that the first robot may release the first frame to start positioning a second frame while the second robot continues working on the first frame, installing final fasteners. This results in a quicker and more efficient process.

In an embodiment the number of temporary fasteners is at least 20% the number of final fasteners.

In an embodiment, step (f) comprises a first sub-step of drilling holes up to a first diameter for installing temporary fasteners and a second sub-step of drilling holes up to a second diameter for installing final fasteners, the second diameter being different from the first diameter.

In an embodiment, step (b) further comprises recording the established local reference. Advantageously, by recording the established local reference the first robot and/or the second robot will be able to repeat a previous position without the need to establish it again. The established local reference can be recorded or controlled using a controller. One or more local reference may be established and/or recorded.

In an embodiment, the skin is made of composite material, preferably of carbon fiber reinforced polymer (CFRP).

In an embodiment, steps (b) to (g) are repeated to assembly a plurality of frames. In an embodiment, step (a) is also repeated for positioning an additional frame in an area of the aircraft shell the marks of which have not been previously identified.

In an embodiment, the aircraft shell is of full barrel type and the method comprises, once the frames of a first portion of the aircraft shell have been assembled, rotate the aircraft shell and perform steps (a) to (g) to assemble at least one frame of a second portion of the aircraft shell. In an embodiment a first portion of the aircraft shell is substantially a first half of the aircraft shell and the second portion of the aircraft shell is substantially a second half of the aircraft shell.

In an embodiment, the reference marks are performed onto the skin during a curing process prior to the process of assembling the frames to the aircraft shell.

In an embodiment, the reference marks are indentations and/or projections performed on the skin.

In an embodiment the aircraft shell is a fuselage shell.

The invention also provides a method for the manufacturing of an aircraft shell with frames, the method comprising the following steps:
(i) positioning a plurality of stringers in a male mandrel, the male mandrel comprising pocket allocations for receiving the stringers, and laying up on the male mandrel a skin, the male mandrel comprising projections and/or indentations for performing a plurality of reference marks onto the skin;
(ii) co-curing the skin with the stringers, thus obtaining an aircraft shell;
(iii) removing the aircraft shell from the male mandrel and fixing the aircraft shell to avoid movement thereof; and
(iv) assembling at least one frame in the aircraft shell;
wherein the assembly of at least one frame is performed according to the method of any of the embodiments of the first inventive aspect.

In an embodiment where the male mandrel comprises projections for performing a plurality of reference marks onto the skin, reference marks are engraved on the skin in the form of indentations corresponding to the projections of the male mandrel.

In an embodiment where the male mandrel comprises indentations for performing a plurality of reference marks onto the skin, reference marks are performed on the skin in the form of projections corresponding to the indentations of the male mandrel. These projections performed on the skin are due to the resin present in the skin entering the indentations of the male mandrel during the curing step.

The reference marks performed on the skin during the curing step, either as indentations or as projections, remain after the curing step.

In an embodiment of the method for the manufacturing of an aircraft shell, the projections and/or indentations are dent line shaped.

All the features described in this specification (including the claims, description and drawings) and/or all the steps of the described method can be combined in any combination, with the exception of combinations of such mutually exclusive features and/or steps.

BRIEF DESCRIPTION OF THE DRAWINGS

These and other characteristics and advantages of the invention will become clearly understood in view of the detailed description of the invention which becomes apparent from a preferred embodiment of the invention, given just as an example and not being limited thereto, with reference to the drawings.

DETAILED DESCRIPTION OF THE PREFERRED EMBODIMENTS

The present invention provides a method for the assembly of frames (4) in an aircraft shell (1), wherein the aircraft shell (1) comprises a skin (2) and a plurality of stringers (3) co-cured with the skin (2). An embodiment of an aircraft shell (1) is shown in FIG. 3.

Figure 3:
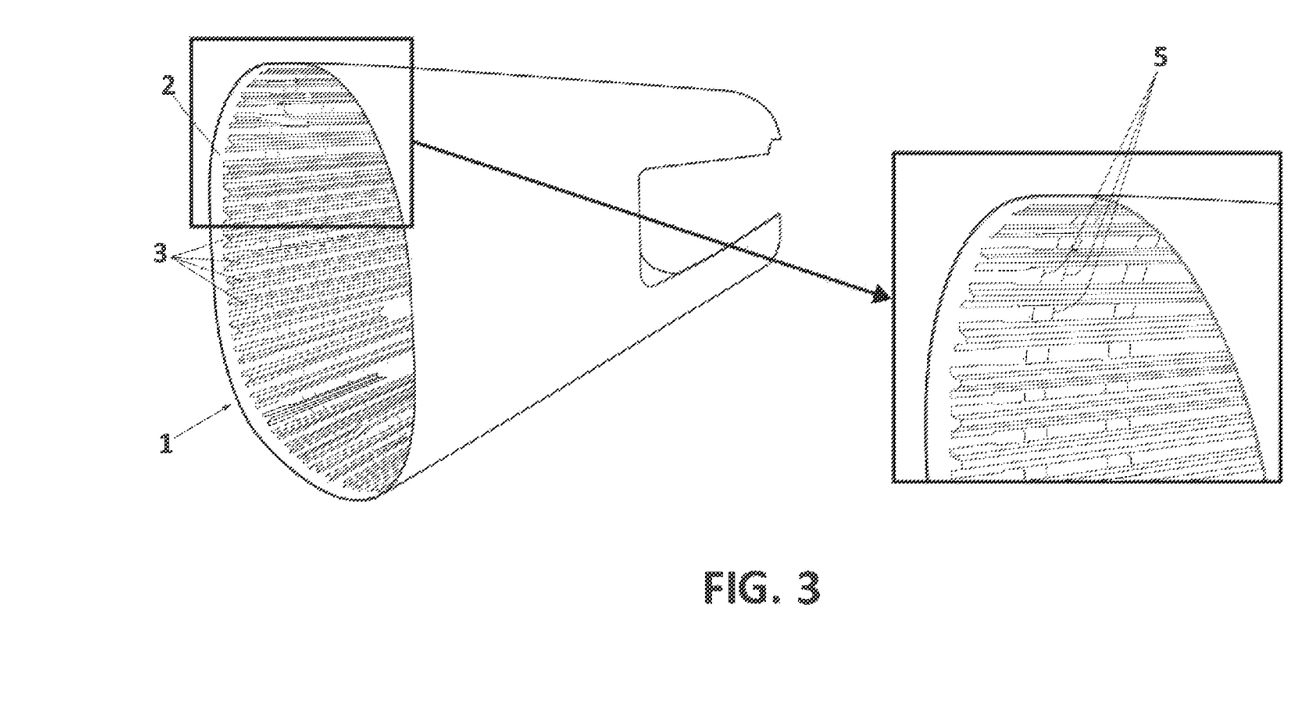
FIG. 3 shows reference marks on the skin of an aircraft shell.

As visible in FIG. 3, the inner side of the skin (2) has a plurality of reference marks (5). The inner side of the skin (2) will be understood as the side intended for placing the frames (4), whereas the outer side of the skin (2) is the opposite side. In FIG. 3 the aircraft shell (1) is of full barrel type and the inner side of the skin (2) is the side defining the inner of the barrel shape and provided with stringers (3). In an embodiment the skin (2) is made of CFRP. In an embodiment the stringers (3) are omega stringers.

The method of the invention comprises the following steps:
(a) identifying the reference marks (5) on the skin (2) using a first robot (6) with artificial vision on board;
(b) establishing a local reference for the positioning of each frame (4) based on at least one reference mark (5);
(c) grabbing a frame (4) using the first robot (6);
(d) establishing a relative position between the first robot (6) and the frame (4) based on at least one reference feature of the frame (4);
(e) positioning the frame (4) on an inner side of the aircraft shell (1) using the first robot (6);
(f) drilling holes through the frame (4) and skin (2); and
(g) attaching the frame (4) to the skin (2) with fasteners;
wherein steps (f) and (g) are performed by a second robot (7).

Thus, according to the present invention, a first robot (6) with artificial vision on board identifies the reference marks (5) present on the skin (2) of the aircraft shell (1). The reference marks (5) are preferably performed during a curing process of the skin (2) with the stringers (3) to form the aircraft shell (1).

Figure 1:
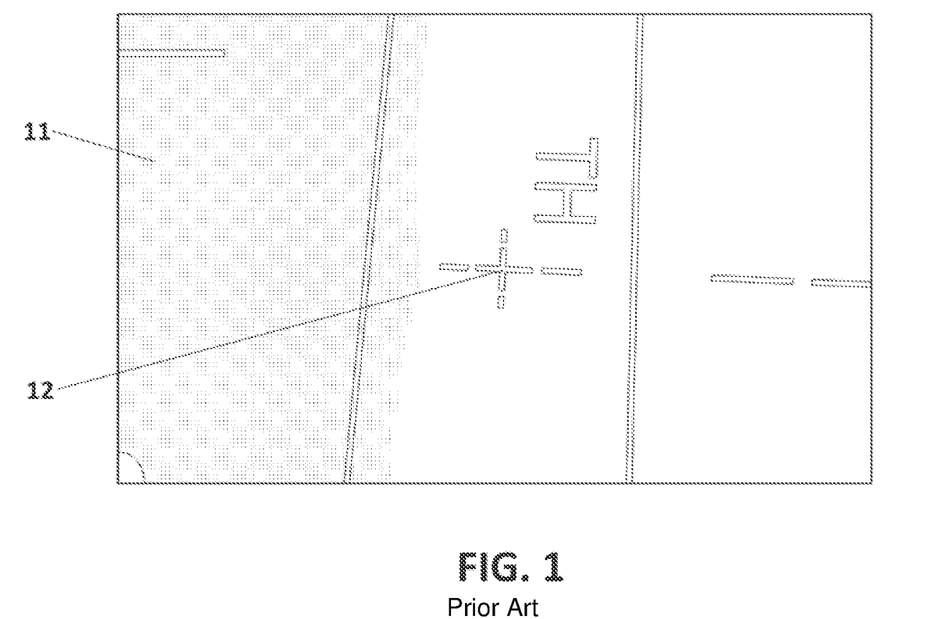
FIG. 1 shows a mark performed according to a process of the state of the art.
Figure 2:
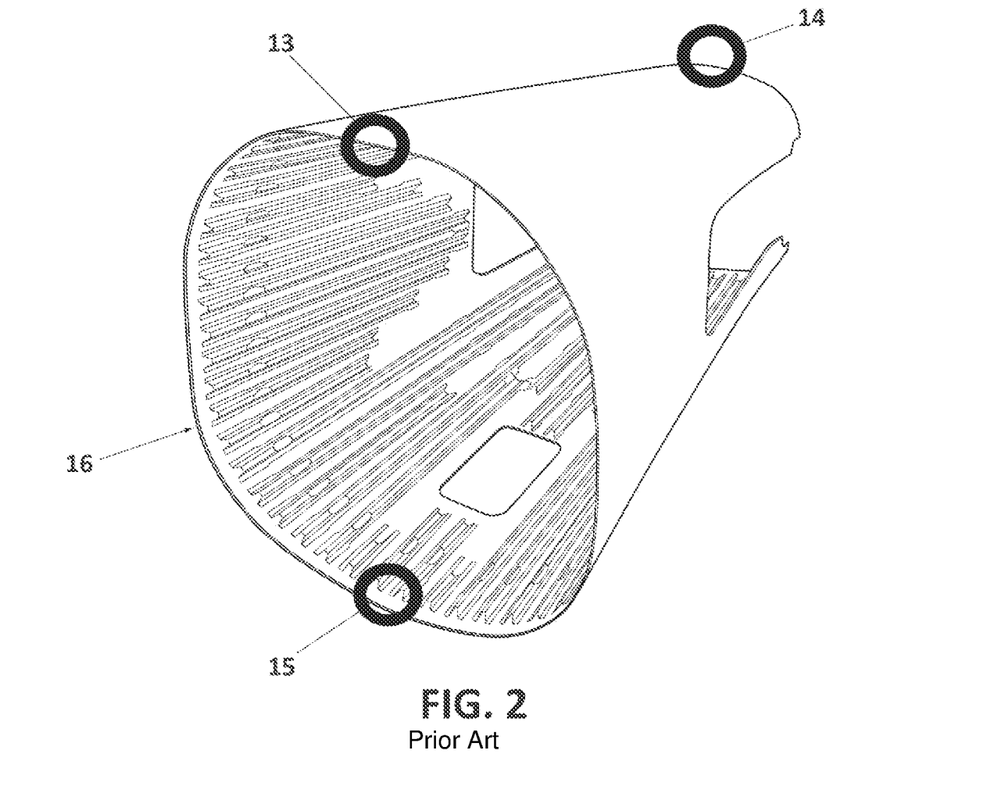
FIG. 2 schematically shows the position of three tooling holes in an aircraft skin according to a process of the state of the art.

The known process for manufacturing an aircraft shell (16) involves performing marks (12) on the skin (11) of the aircraft shell (16). A detailed view of a skin (11) and marks (12) performed according to the state of the art are shown in FIG. 1. The marks (12) are used in the state of the art to perform tooling holes (13, 14, 15). FIG. 2 shows an aircraft shell (16) produced according to the state of the art, where the position of three tooling holes (13, 14, 15) is shown. The tooling holes (13, 14, 15) are used to fix the aircraft shell (16) to a jig using tooling pins, for positioning and carrying the aircraft shell (16) and keeping the aircraft shell geometry during the assembly of the frames.

Figure 4:
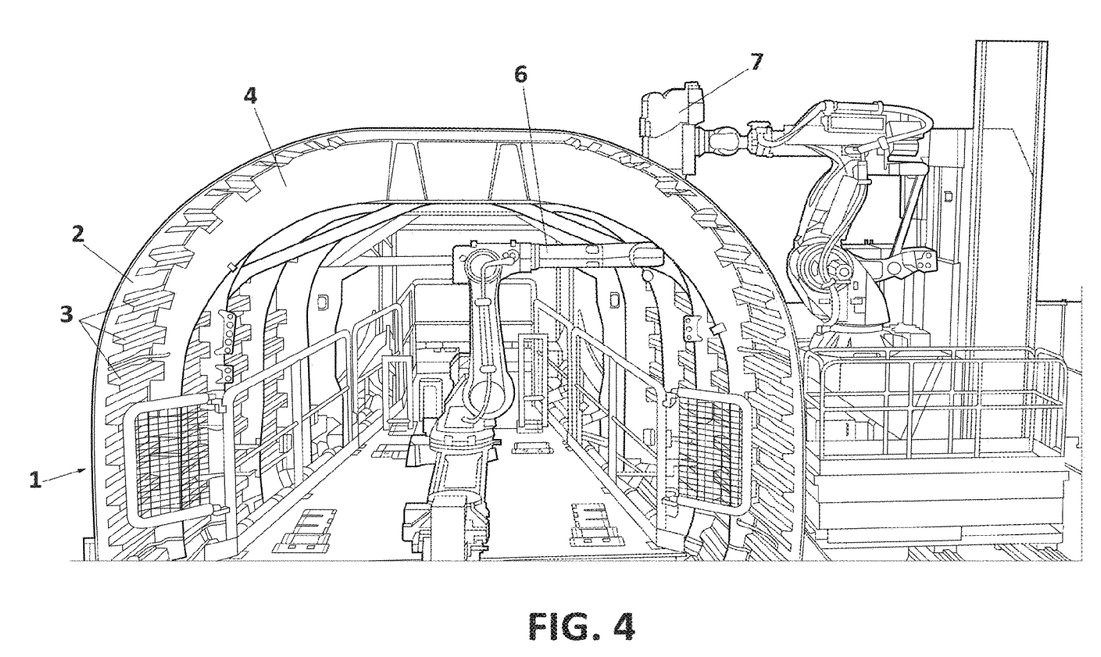
FIG. 4 schematically shows part of a method for the assembly of frames according to an embodiment of the present invention.

According to the present invention, reference marks (5) are not used to perform tooling holes for fixing and carrying the aircraft shell. Instead, reference marks (5) are used as a visual reference for positioning the frames (4). In the present invention reference marks present on the skin are identified using a first robot (6) with artificial vision on board. FIG. 4 schematically shows part of a method for the assembly of frames according to an embodiment of the present invention, where the first robot (6) is visible. Based on at least one identified reference mark (5), a local reference is established for the positioning of each frame (4). This involves defining the position of the first robot (6) relative to the aircraft shell (1) for the positioning of each frame (4). Preferably, the local reference is recorded and/or controlled with a controller to ensure that the first robot (6) is able to repeat it.

A frame (4) to be assembled is grabbed using the first robot (6) and a relative position between the first robot (6) and the frame (4) is established based on at least one reference feature of the frame (4). The reference feature of the frame (4) shall be understood as any feature of the frame visually detectable by the first robot (6), such as a mark, a contour of the frame, a hole or any combination thereof. In an embodiment, the frames (4) are aluminum frames and machine contours of holes present in the frames (4) are used as reference features. A single reference feature or a combination of reference features may be used.

Once the relative position between the first robot (6) and the frame (4) is established, the first robot (6) positions the frame (4) on an inner side of the aircraft shell (1). FIG. 4 shows the first robot (6) holding a frame (4) positioned on the inner side of the aircraft shell (1). As visible in FIG. 4, a platform may be placed to facilitate movement of the first robot (6) along a longitudinal direction of the barrel-type aircraft shell (1).

While the first robot (6) holds the frame (4) in place, a second robot (7) drills holes through the frame (4) and the skin (2). The holes are used to attach the frame (4) to the skin (2) with fasteners, such as bolts. FIG. 4 schematically shows an embodiment where the first robot (6) holds a frame (4) in place on the inner side of the aircraft shell (1) while a second robot (7) working from an outer side of the aircraft shell (1) drills holes through the frame (4) and skin (2) and attaches the frame (4) to the skin (2) with fasteners. FIG. 4 shows a view of the process where several frames (4) have been already assembled. Assembly of several frames (4) may be performed by repeating steps (b) to (g) for each frame (4).

In an embodiment, the position of the second robot (7) is established based on the position of the first robot (6) and/or on a local reference for the positioning of a frame. According to this embodiment, the first robot (6) itself and/or a controller sends data to the second robot (7), the data comprising the position of the first robot (6) and/or the local reference for the positioning of the frame already established. The second robot (7) establishes its own position based on the location of the first robot and/or on the local reference in order to drill holes through the skin (2) and the frame (4) hold by the first robot (6).

In an embodiment, step (f) of drilling comprises a first sub-step of drilling holes up to a first diameter for installing temporary fasteners and a second sub-step of drilling holes up to a second diameter for installing final fasteners, the second diameter being different from the first diameter. Also, in an embodiment, step (g) comprises a first sub-step of installing temporary fasteners and a second sub-step of installing final fasteners. The installation of temporary fasteners for temporary securing the frames (4) allows the first robot (6) to initiate picking and positioning of a subsequent frame (4) while the second robot (7) finishes the attachment of a previous frame (4) by installing the final fasteners. In an embodiment the number of temporary fasteners is at least 20% the number of the final fasteners.

In the embodiment shown in FIG. 4 the aircraft shell (1) is of full barrel type. In an embodiment, the method comprises assembling the frames (4) of a first portion of the aircraft shell (1), such as a first half of the aircraft shell (1), rotating the aircraft shell (1) and performing steps (a) to (g) to assemble one or several frames (4) of a second portion of the aircraft shell, such as a second half of the aircraft shell.

Although the invention has been described for a full barrel type shell, it will be understood that the method of the invention is applicable to any type of aircraft shells (1).

The present invention also provides a method for the manufacturing of an aircraft shell (1) with frames (4), the method comprising the following steps:
  (i) positioning a plurality of stringers (3) in a male mandrel, the male mandrel comprising pocket allocations for receiving the stringers (3), and laying up on the male mandrel a skin (2), the male mandrel comprising projections and/or indentations for performing a plurality of reference marks (5) onto the skin (2);
  (ii) co-curing the skin (2) with the stringers (3), thus obtaining an aircraft shell (1);
  (iii) removing the aircraft shell (1) from the male mandrel and fixing the aircraft shell (1) to avoid movement thereof; and
  (iv) assembling at least one frame (4) in the aircraft shell (1);
    wherein the assembly of at least one frame (4) is performed according to the method of the first inventive aspect.

In an embodiment, the projections and/or indentations are dent line shaped.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for an assembly of frames in an aircraft shell, wherein the aircraft shell comprises a skin and a plurality of stringers co-cured with the skin, wherein the skin has a plurality of reference marks that are engraved on the skin, the method comprising the following steps: (a) identifying the plurality of reference marks on the skin using a first robot with artificial vision on board; (b) establishing a local reference for the positioning of each frame based on at least one of the plurality of reference marks; (c) grabbing a frame using the first robot; (d) establishing a relative position between the first robot and the frame based on at least one reference feature of the frame; (e) positioning the frame on an inner side of the aircraft shell using the first robot; (f) drilling holes through the frame and skin; and (g) attaching the frame to the skin with a plurality of fasteners; wherein steps (f) and (g) are performed by a second robot while the first robot continuously holds the frame in place; and wherein only when the second robot has arranged at least two of the plurality of the fasteners in step (g), the first robot releases the frame.

2. The method according to claim 1, wherein steps (f) and (g) are performed by the second robot working from an outer side of the aircraft shell while the first robot holds the frame in place on the inner side of the aircraft shell.

3. The method according to claim 1, wherein the at least one reference feature of the frame is a mark, a contour of the frame, a hole or a combination thereof.

4. The method according to claim 1, wherein step (b) further comprises recording the established local reference.

5. The method according to claim 1, wherein steps (b) to (g) are repeated to assemble a plurality of frames.

6. The method according to claim 1, wherein the aircraft shell is of full barrel type, and wherein the method comprises, once the frames of a first portion of the aircraft shell have been assembled, rotate the aircraft shell and perform steps (a) to (g) to assemble at least one frame of a second portion of the aircraft shell.

7. The method according to claim 1, wherein the reference marks are performed onto the skin during a curing process.

8. The method according to claim 1, wherein the at least one reference features is a slot for the installation of wiring or other elements.

9. The method according to claim 1, wherein the tolerance of the first robot to position the frame is around ±0.4 mm.

10. The method according to claim 1, wherein step (g) comprises a first sub-step of installing temporary fasteners and a second sub-step of installing final fasteners.

11. The method according to claim 10, wherein step (f) comprises a first sub-step of drilling holes up to a first diameter for installing temporary fasteners and a second sub-step of drilling holes up to a second diameter for installing final fasteners, the second diameter being different from the first diameter.

12. The method according to claim 1, wherein the skin is made of composite material.

13. The method according to claim 12, wherein the composite material comprises carbon fiber reinforced polymer.

14. A method for the manufacturing of an aircraft shell with frames, the method comprising the following steps:
 (i) positioning a plurality of stringers in a male mandrel, the male mandrel comprising pocket allocations for receiving the stringers, and laying up on the male mandrel a skin, the male mandrel comprising at least one of projections or indentations for performing a plurality of reference marks onto the skin;
 (ii) co-curing the skin with the stringers, thus obtaining an aircraft shell;
 iii) removing the aircraft shell from the male mandrel and fixing the aircraft shell to avoid movement thereof; and
 (iv) assembling at least one frame in the aircraft shell;
 wherein the assembly of at least one frame is performed according to the method of claim 1.

15. The method for the manufacturing of an aircraft shell according to claim 14, wherein the projections or the indentations are dent line shaped.

16. A method for an assembly of frames in an aircraft shell, wherein the aircraft shell comprises a skin and a plurality of stringers co-cured with the skin, wherein the skin has a plurality of reference marks, the method comprising the following steps:
 (a) identifying the plurality of reference marks on the skin using a first robot with artificial vision on board;
 (b) establishing a local reference for the positioning of each frame based on at least one of the plurality of reference marks;
 (c) grabbing a first frame using the first robot;
 (d) establishing a relative position between the first robot and the first frame based on at least one reference feature of the first frame;
 (e) positioning the first frame on an inner side of the aircraft shell using the first robot;
 (f) drilling holes through the first frame and skin; and
 (g) attaching the first frame to the skin with fasteners;
 wherein steps (f) and (g) are performed by a second robot while the first robot holds the first frame in place; and
 wherein step (g) comprises the following sub-steps:
  (g1) installing a predetermined number of temporary fasteners on the first frame;
  (g2) releasing the first frame by the first robot after installing the predetermined number of the temporary fasteners on the first frame;
  (g3) positioning of a second frame by the first robot after the first robot has released the first frame; and
  (g4) installing final fasteners on the first frame with the second robot while the first robot is positioning the second frame.

17. A method for an assembly of frames in an aircraft shell, wherein the aircraft shell comprises a skin and a plurality of stringers co-cured with the skin, wherein the skin has a plurality of reference marks, the method comprising the following steps:
 (a) identifying the plurality of reference marks on the skin using a first robot with artificial vision on board;
 (b) establishing a local reference for the positioning of each frame based on at least one of the plurality of reference marks;
 (c) grabbing a frame using the first robot;
 (d) establishing a relative position between the first robot and the frame based on at least one reference feature of the frame;
 (e) positioning the frame on an inner side of the aircraft shell using the first robot, wherein the tolerance of the first robot to position the frame is around ±0.4 mm;
 (f) drilling holes through the frame and skin; and
 (g) attaching the frame to the skin with fasteners;
 wherein steps (f) and (g) are performed by a second robot while the first robot holds the frame in place; and
 wherein when the second robot has arranged a predetermined number of the fasteners in step (g), the first robot releases the frame.

* * * * *